United States Patent
Segato et al.

(10) Patent No.: US 9,346,504 B2
(45) Date of Patent: May 24, 2016

(54) SEAT SUPPORT

(75) Inventors: Stefano Segato, Vicenza (IT); Felix Sam, Padova (IT)

(73) Assignee: SELLE ROYAL S.P.A., Pozzoleone (Vicenza) (IT)

( * ) Notice: Subject to any disclaimer, the term of this patent is extended or adjusted under 35 U.S.C. 154(b) by 242 days.

(21) Appl. No.: 13/643,017

(22) PCT Filed: Apr. 6, 2011

(86) PCT No.: PCT/IB2011/051489
§ 371 (c)(1),
(2), (4) Date: Jan. 4, 2013

(87) PCT Pub. No.: WO2011/141832
PCT Pub. Date: Nov. 17, 2011

(65) Prior Publication Data
US 2013/0099531 A1     Apr. 25, 2013

(30) Foreign Application Priority Data
May 13, 2010   (IT) .............................. VR2010A0102

(51) Int. Cl.
| | |
|---|---|
| *B62J 1/18* | (2006.01) |
| *B62J 1/00* | (2006.01) |
| *C08G 18/36* | (2006.01) |
| *C08G 18/42* | (2006.01) |
| *C08G 18/60* | (2006.01) |
| *C08L 77/02* | (2006.01) |
| *C08G 101/00* | (2006.01) |

(52) U.S. Cl.
CPC .... *B62J 1/18* (2013.01); *B62J 1/00* (2013.01); *C08G 18/36* (2013.01); *C08G 18/428* (2013.01); *C08G 18/4288* (2013.01); *C08G 18/60* (2013.01); *C08L 77/02* (2013.01); *C08G 2101/00* (2013.01)

(58) Field of Classification Search
CPC ............................................................ B62J 1/26
USPC ........................................................ 428/195.1
See application file for complete search history.

(56) References Cited

U.S. PATENT DOCUMENTS

| | | | |
|---|---|---|---|
| 4,722,946 A * | 2/1988 | Hostettler | ...................... 521/158 |
| 5,165,752 A | 11/1992 | Terry | |
| 6,059,359 A | 5/2000 | Cassani | |
| 2005/0212337 A1 | 9/2005 | Lee | |
| 2009/0270520 A1 | 10/2009 | Sasaki et al. | |

FOREIGN PATENT DOCUMENTS

| | | |
|---|---|---|
| EP | 0903321 | 3/1999 |
| EP | 1921098 | 5/2008 |
| IT | 1993A000163 | 10/1993 |
| WO | WO2008099364 | 8/2008 |
| WO | WO2010035679 | 4/2010 |

* cited by examiner

*Primary Examiner* — Gerard Higgins
(74) *Attorney, Agent, or Firm* — Tutunjian & Bitetto, P.C.

(57) ABSTRACT

A seat support and a method for obtaining same includes a support body made from polymeric materials derived from castor oil, a padding positioned on said body, and a coating that covers the padding. The padding includes at least one layer of foam made at least in part from a component derived from renewable sources and/or of natural origin like palm oil, castor oil, soybean oil, colza oil, or in general a vegetable oil, and it can include a layer and/or insert made from gel obtained by adding in dispersion with a polyolic and or isocyanic component, possible particles of cork and possible compatibilizing agents to maintain the continuity of the polymeric characteristics with the coating and promote sticking. The coating includes a polymer formed from castor oil. The seat support according to the present invention is therefore environmentally-friendly, biodegradable, easy to recycle and/or dispose of.

12 Claims, 1 Drawing Sheet

SEAT SUPPORT

TECHNICAL FIELD

The present invention refers to an improved seat support, like padding, cushions, chairs, armchairs and, more specifically, a bicycle saddle, to which we shall explicitly refer as an example, and a method for making it.

DESCRIPTION OF RELATED ART

Many models of seat supports are known. A particularly useful and comfortable bicycle saddle, for example, is the one described in EP 0903321, to the same Applicant, where comfort is ensured by the fact that the saddle is padded with gel and polyurethane foam covered with a coating, known as cover, of PVC of a thickness of about 0.7-0.8 mm. The whole thing rests on a plastic body that is connected to the bicycle frame.

A further example is the one described in EP 2139751, again to the same Applicant, in which the saddle is made up of natural elements with low environmental impact. In particular, such a saddle has a body made up of natural fibers immersed in a thermoplastic or thermosetting polymeric matrix and areas with differentiated deformability.

However, the ever more stringent standards and a renewed sensitivity to environmental issues are driving producers to propose articles that, as well as being, comfortable, are also increasingly environmentally-friendly, biodegradable or easy to recycle or dispose of. The saddle in EP 0903321, for example, does not fully satisfy these requirements and the saddle in EP 2139751 does not use polymeric materials of the polyurethane type with low environmental impact.

SUMMARY OF THE INVENTION

A purpose of the present invention is to improve the state of the art. Another purpose of the present invention is to make a saddle and/or a seat support consisting of materials derived from renewable sources, winch is environmentally-friendly, at least partially biodegradable, easy to recycle and/or dispose of. Another purpose of the present invention is to make a saddle that is improved in environmental terms with respect to EP 0903321.

Another purpose of the present invention is to make a saddle that is improved in terms of comfort together with being environmentally friendly with respect to EP 2139751.

A further purpose of the present invention is to make a saddle that is improved in terms of cost-effectiveness with respect to EP 2139751. According to an aspect of the present invention an improved seat support is foreseen.

A further purpose of the present invention is to have a method for making a saddle and/or a seat support that uses materials derivates from renewable sources that are environmentally-friendly, biodegradable and easy to recycle.

Another purpose of the present invention is to have a method for making a saddle and/or a seat support that is cost-effective.

According to an aspect of the present invention a method for making an improved seat support is foreseen.

The dependent claims refer to preferred and advantageous embodiments of the invention.

BRIEF DESCRIPTION OF THE DRAWINGS

Further characteristics and advantages of the invention will become clearer from the example description of a bicycle saddle, together with the attached drawings, in which.

DETAILED DESCRIPTION OF PREFERRED EMBODIMENTS

Figure 1:
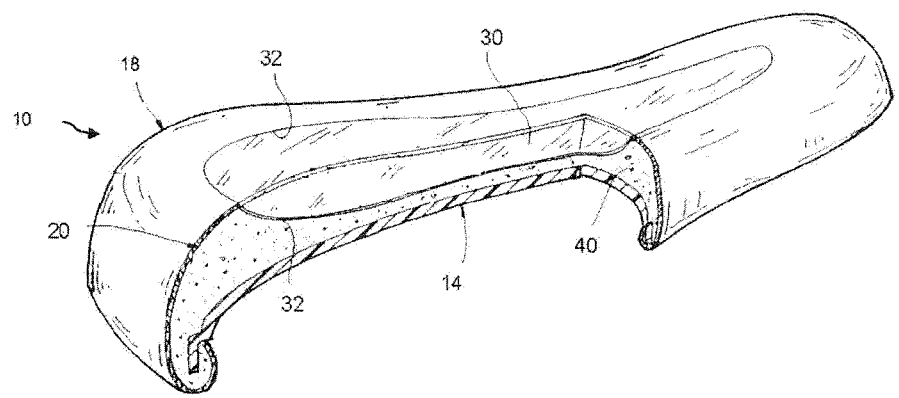
FIG. 1 shows a section view of a seat support according to the invention.
Figure 2:
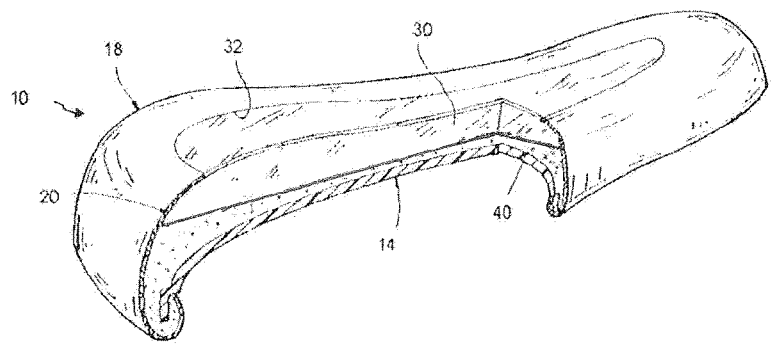
FIG. 2 shows a section view of a further embodiment of a seat support according to the invention.

A seat support 10, like for example a bicycle saddle, comprises a support body 14 on which a padding 18 is mounted covered by a coating 20 that can comprise a transparent window 32. The padding 18 is in turn formed from at least one layer of foam 40. The padding 18 can comprise a layer and/or an insert made from gel 30.

The support body 14 comprises at least one polymer, called RILSAN® 11 and/or, in general, polymeric materials derived from renewable sources and/or of natural origin, derived from castor oil and/or other vegetable substances, for example polylactic acid.

The coating 20 comprises at least one polymer, for example polyamidic such as polyamide 11 called PEBAX®, made from castor oil and/or other vegetable substances and/or fabric, and/or non-woven fabric with fibers of natural origin that are impermeabilized with natural materials like for example latex. The advantage obtained, as well as the fact of being made from environmentally friendly material, is also that of being able to reduce the thickness of the coating 20 to values of between 0.1 mm and 0.6 mm and preferably between 0.2 mm and 0.5 mm at the same time improving the comfort thereof.

Indeed, in this way the interference of the interface with the soft parts of the seat support 10, i.e. the at least one layer of foam 40 and the layer and/or the insert made from gel 30, is reduced, thus increasing the feeling of comfort given to the user. The at least one layer of foam 40 of the padding 18 is made up of at least 5-95%, and preferably 20-80% and even more preferably 30-55% of a component derived from renewable sources and/or of natural origin: the possible remaining part of the at least one layer of foam 40 is polyurethane foam and/or foam of another kind, for example ethylvinyl acetate (EVA) and/or in general it comprises at least one derivative of a polymeric matrix.

The component derived from renewable sources and/or of natural origin of the at least one layer of foam 40 comprises at least one from: reaction intermediates derived from renewable sources and/or of natural origin, and/or palm oil, and/or so bean oil, and/or castor oil, and/or colza oil, and/or, in general, any vegetable oil, so as to at least partially maintain the continuity of the polymeric characteristics, like for example the monomeric sequences of the polymer, of the interfaces between the material of the coating 20 of natural origin, the polyurethane foam and the support body 14, also of vegetable origin, in particular derived from castor oil and/or other vegetable substances.

In order to obtain the at least one layer of foam 40 the polyolic component is reacted with a polyisocyanate based on diphenylmethane and/or polyisocyanate mixed with other isomers and/or polyisocyanate added to author partially substituted with a component derived from renewable sources and/or of natural origin and/or with the addition of a polyol derived from renewable sources and/or of natural origin. The naturally-based polyurethane foam, obtained from the reaction between a polyolic component in the presence of water with an isocyanate based on methylene diisocyanate (MDI), has a density of about 40-250 kg/m$^3$.

Alternatively, the whole thing is made to react without water, but in the presence of auxiliary expansion agents for manufactured products having a density of about 150-500 kg/m$^3$.

Moreover, the coating. 20 also has the synthetic plasticizers eliminated from it, the use of which will soon be banned, obtaining an improved seat support with a composition at least 10% of vegetable origin.

The production of the at least one layer of foam 40 can be carried out through the vacuum system to the same Applicant, according to Italian patent applications VI1993A000163 and/or VI1997A000160, and/or possibly by making lightened foams through another system to the same Applicant according to Italian patent application VI2005A000231, to connect such an at least one layer of foam 40 to the body 14, to the layer and/or insert made from gel 30 and to the coating 20. Alternatively, such a connection can be made, not through a vacuum system, by using glues of natural origin and/or through a coating made by hand.

The transparent window 32 is formed for one pan from polymeric material, like for example polyurethane and/or other polymeric materials and for the remaining part, for example 50%, from products derived from renewable sources and/or of vegetable origin, like for example the polymer called PEBAX© based on castor oil and/or another vegetable substance.

The layer and/or the insert made from gel 30, based on natural substances, comprises polyisocyanate and/or polyisocyanate mixed with other isomers and/or polyisocyanate modified with polyols derived from renewable sources and/or of natural origin. The layer and/or the insert made from gel 30 can alternatively be obtained through a dispersion, in a polyolic and/or isocyanic component, of particles of cork and/or corn powder and/or fibers and/or other products derived from renewable sources and/or of natural origin and, possibly, means for compatibilizing author sticking the layer and/or the insert made from gel 30 with the coating 20 and/or with the at least one layer of foam 40 and/or with the support body 14 to give suitable physical properties, like thermal and/or mechanical ones.

In an alternative embodiment, the polyolic component is at least partially derived from renewable sources and/or of natural origin; the possible means for compatibilizing and/or sticking, the layer and/or the insert made from gel 30 with the coating 20 and/or with the at least one layer of foam 40 and/or with the support body 14 comprise at least in part compatibilizing agents derived from renewable source and/or of natural origin, like for example castor oil.

Such means promote compatibility acting as chain extenders between the interface of the gel and of the foam based on natural polyols.

Moreover, the composition and the nature of the polyols derived from renewable sources and/or of natural origin can be varied within the limits of tolerance of the method to avoid modifying the final characteristics of the saddle.

The percentages of the various components are determined by the final physical-mechanical characteristics that it is wished to obtain. In particular, for example, the polyol based on palm oil, having a long polymeric chain, ensures greater flexibility of the polyurethane matrix, castor oil acts as a chain extender and soybean oil is a copolyol. Colza oil, as it has no hydroxyl groups, runs freely inside the polymeric matrix giving an effect of softness. The catalytic mix and the type of surfactants were selected as a function of the different reactivity profile of the polyols with the diisocyanate.

In terms of environmental protection, the use of products obtained from renewable sources and/or of natural origin per se means a reduction of the environmental impact as a result of the reduction of use of petrochemical products from fossil sources, and the consequent lower emission of greenhouse gases like $CO_2$. Moreover, since they are in part of vegetable origin, such products can be biodegradable and therefore suitably composted. In terms of disposal, many plastic materials can be recycled and reused. For example, polyurethane is regenerated for under-rugs, after grinding it is introduced as fillers in new formulations and, in some cases, it is used in incinerators for energy recovery.

The present invention also refers to a method for producing a seat support 10, for example a bicycle saddle, comprising a support body 14, a padding 18 positioned on said body, and a coating 20 that covers said padding 18, comprising the step, of supplying the support body 14 comprising at least one polymer, called RILSAN© 11, and/or, in general, polymeric materials derived from renewable sources and/or of natural origin, derived from castor oil or from other vegetable substances, for example polylactic acid, providing a mold comprising at least one female part and a male part, providing the coating 20 comprising at least one polymer, for example polyamide 11 called PEBAX®, made from castor oil and/or other vegetable substances and/or fabric and/or non-woven fabric with fibers of natural origin that are impermeabilized with natural materials, like for example latex, and placing the coating 20 in the female part of the mold.

If necessary, the coating 20 can be shaped through a vacuum system or shaped by hand.

Such is method comprises the steps of casting onto the coating 20 at least one layer of foam 40 of the padding 18 comprising at least 5-95%, and preferably 20-80% and even more preferably 30-55% of a component derived from renewable sources and/or of natural origin, selected among at least one from: reaction intermediates derived from renewable sources and/or of natural origin and/or palm oil and/or castor oil and/or soybean oil and/or colza oil and/or in general any vegetable oil. In an alternative embodiment, the method comprises a step of casting onto the coating 20 at least one layer of foam 40 comprising at least one derivative of the polymeric matrix, for example polyurethane foam and/or foam of another kind, like for example ethylvinyl acetate (EVA). The method also comprises the following steps: reacting a polyolic component of said at least one layer of foam 40 and/or water with a polyisocyanate based on diphenylmethane and/or polyisocyanate mixed with other isomers and/or poly added to and/or partially substituted with a component derived from renewable sources and/or of natural origin and/or with the addition of a polyol derived from renewable sources and/or of natural origin and, obtaining the at least one layer of foam 40 of the padding 18.

In an alternative embodiment the method according to the invention comprises the following step: reacting the polyolic component and/or auxiliary expansion agents with a polyisocyanate based on diphenylmethane and/or polyisocyanate mixed with other isomers and/or polyisocyanate added to and/or partially substituted with as component derived from renewable sources and/or of natural origin author with the addition of a polyol derived from renewable sources and/or of natural origin and obtaining, the at least one layer of foam 40 of the padding 18.

In such a reaction step, the polyolic composition and/or the polyolic component is at least partially derived from renewable sources and/or of natural origin.

Such a method also comprises the steps of connecting the at least one layer of foam 40 to the body 14, to the layer and/or insert made from gel 30 and to the coating 20 through a vacuum system to the same Applicant, according to Italian patent applications VI1993A000163 and/or VI1997A000160, and/or possibly by making lightened foams through another system to the same Applicant, according to Italian patent application VI2005A000231.

Alternatively, such a step of connecting the coating 20 to the at least one layer of foam 40, to the body 14, to the layer and/or insert made from gel 30 and to the coating 20, can take place using glues of natural origin and/or through a coating made by hand.

Moreover the method for producing a seat support according to the invention comprises the following steps: inserting the support body 14 into the male part of the mold and closing the mold with the support body 14 and/or with the male part of the mold.

Such a method also comprises the step of casting at least one layer and/or an insert made from gel 30 of the padding 18 comprising a polyolic component. Moreover, in an alternative step, the method according to the invention comprises the step of casting the at least one insert made from gel 30 in which the polyolic component is derived from renewable sources and/or of natural origin.

Alternatively, such a method comprises the steps of dispersing, in such a polyolic component derived from renewable sources and/or of natural origin, and/or in such a isocyanic component, particles of cork and/or corn powder and/or fibers and/or other products derived from renewable sources and/or of natural origin and, possibly, means for compatibilizing and/or sticking the layer and/or the insert made from gel 30 with the coating 20 and/or the at least one layer of foam 40 and/or the support body 14 and casting the whole thing to obtain the at least one layer and/or insert made from gel 30 of the padding 18.

The possible means for compatibilizing and/or sticking the layer and/or the insert made from gel 30 with the coating 20 and/or with the at least one layer of foam 40 and/or with the support body 14 can for example comprise compatibilizing agents, possibly derived from renewable sources and/or of natural origin such as castor oil, to give suitable physical properties like for example thermal and/or mechanical ones.

Moreover, the method comprises the steps of lightly agitating during the aforementioned dispersing step, in the polyolic and/or isocyanic component, the particles of cork and/or corn powder and/or fibers and/or other products derived from renewable sources and/or of natural origin and, possibly, means for compatibilizing and/or sticking the layer and/or the insert made from gel 30 with the coating 20 and/or the at least one layer of foam 40 and/or the support body 14 and of keeping the dispersion homogeneous through a spiral agitator and recirculation system.

The method according to the invention also comprises the step of casting the at least one layer and/or insert made from gel 30 comprising polyisocyanate and/or polyisocyanate mixed with other isomers and/or polyisocyanate modified with polyols derived from renewable sources and/or of natural origin.

A further step included in the method according to the invention is inserting into the coating 20 a transparent window 32 made from polymeric material comprising for example polyurethane and/or other polymeric materials and products derived from renewable sources and/or of vegetable origin, like for example a polymer called PEBAX© based on castor oil and/or another vegetable substance.

The present invention also concerns a new manufacturing technique concerning the introduction and dosing in the gel of cork and/or of other substances derived from renewable sources and/or of vegetable origin.

The cork and/or the other substances derived from renewable sources and/or of vegetable origin are, indeed, dosed through a rubber stator pump in the foaming head and the method according to the invention has the following steps: dosing said cork particles and/or corn powder and/or fibers and/or other products derived from renewable sources and/or of natural origin through a rubber stator pump and/or through an Archimedean screw mechanism and/or through a system with worm screws.

The method described above can be further simplified and made cost-effective thanks to the possibility of using automated production systems, such as injection presses, foaming carousels, etc. The present invention thus conceived can undergo numerous modifications and variants all of which are coveted by the scope of protection of the claims.

The invention claimed is:

1. A seat support comprising a support body, a padding positioned on said body, and a coating that covers said padding, wherein said support body comprises at least one polymeric material, wherein said at least one polymeric material consists of at least one polymeric material derived from at least one of a naturally-based renewable source, a vegetable substance, or a polylactic acid.

2. The seat support according to claim 1, wherein said coating comprises:
   at least one polymer obtained from at least one of a naturally-based renewable source or a vegetable substance; and
   at least one of a fabric or a non-woven fabric.

3. The seat support according to claim 1, wherein said padding comprises at least one layer of foam comprising at least one component derived from a renewable source and/or naturally-based material.

4. The seat support according to claim 3, wherein said at least one component of said at least one layer of foam is at least one selected from the group consisting of a reaction intermediate derived from renewable sources, a material of natural origin, and a vegetable oil.

5. The seat support according to claim 3, wherein said at least one layer of foam further comprises at least one of a polyurethane foam, a foam of another origin, or at least one derivative of a polymeric matrix.

6. The seat support according to claim 1, wherein said padding comprises at least one of a layer or an insert made of gel, wherein the gel comprises at least one of a polyisocyanate, a polyisocyanate mixed with other isomers or a polyisocyanate modified with polyols derived from a naturally-based renewable source.

7. The seat support according to claim 6, wherein said at least one of the layer or the insert made from the gel comprises a polyolic component.

8. The seat support according to claim 7, wherein said polyolic component is at least partially derived from a naturally-based renewable source.

9. The seat support according to claim 7, wherein said at least one of the layer or the insert made from gel comprises a dispersion of particles in said polyolic component and/or an isocyanic component, wherein the particles of are at least one selected from the group consisting cork, corn powder, fibres and other products derived from renewable sources and/or of natural origin.

10. The seat support according to claim 1, wherein said coating comprises a transparent window made from polymeric material comprising polyurethane and/or other polymeric materials and products derived from renewable sources and/or of vegetable origin.

11. The seat support according to claim 4, wherein said coating has a thickness of between 0.1 mm and 0.6 mm.

12. The seat support according to claim 9, wherein the at least one layer or insert further comprises a means for compatibilizing and/or sticking said at least one of the layer or the insert made of gel with said coating, with at least one layer of foam, or with said support body.

\* \* \* \* \*